United States Patent [19]

Doll

[11] Patent Number: 4,476,022
[45] Date of Patent: Oct. 9, 1984

[54] SPIRALLY WRAPPED REVERSE OSMOSIS MEMBRANE CELL

[76] Inventor: David W. Doll, 6138 Tamilyn St., San Diego, Calif. 92122

[21] Appl. No.: 474,567

[22] Filed: Mar. 11, 1983

[51] Int. Cl.$^3$ ............................................ B01D 31/00
[52] U.S. Cl. .................................. 210/21.5; 210/433.2
[58] Field of Search .................. 210/494.1, 321.5, 487, 210/321.1, 433.2

[56] References Cited

U.S. PATENT DOCUMENTS 3,962,095  6/1976  Luppi ................................ 210/494.1
4,235,723 11/1980  Bartlett, Jr. ....................... 210/321.5

Primary Examiner—Frank Spear
Attorney, Agent, or Firm—Frank D. Gilliam

[57] ABSTRACT

A module for use in separating a permeate from a fluid feed mixture. The module employs a serrated product tube with a plurality of perforations or apertures through the serrations to the inside of the tube. The serrations take the form of a helix or a grid. A product spacer with protruding ribs on one surface is folded over the product tube with the ribs on the opposite side of the serrations of the tube, and extending a predetermined length for laminating with additional spacer material and a membrane with a highly porous backing. The free ends of the membrane are sealed together to form an envelope enclosing the product spacer. First and second brine spacers having channels parallel with the axis of the tube separate the envelope portion of the product spacer and membrane so that when the membrane and spacers are spirally wound about the tube, each layer of product spacer and membrane have first and second brine spacers therebetween with the channels of the first and second brine spacers opposing.

18 Claims, 8 Drawing Figures

SPIRALLY WRAPPED REVERSE OSMOSIS MEMBRANE CELL

BACKGROUND OF THE INVENTION

This invention relates to an apparatus for separation or concentration of liquids, separating mixtures of gasses and ultrafiltration of liquids. In particular it pertains to a spirally wound element of uniquely configured layers which support a thinly deposited differentially permeable membrane capable of separating various liquids or gases.

Spirally wrapped semi-permeable membrane fluid separation apertures are well known. Examples are described in U.S. Pat. Nos. 3,367,504, 3,417,870, 3,872,014 and 3,962,096. The sprially wrapped module characteristically employs one or more leaves with each leaf made up of two permselective membranes spaced from each other by a separator grid material through which fluid feed flows. Typically, the membrane is formed from a single elongated membrane sheet, which is folded intermediate of its length to provide a membrane sandwich with the porous material between the membrane folds and with the active separation surfaces of the opposing folds of the membrane sheet away from the product spacer, thus forming a sandwich structure. A grid material is positioned immediately adjacent thereto and upon spirally wrapping the membrane sandwich and backing material tightly about a central mandrel, there is formed a compact roll which is encased in a cylinder, close fitting pressure vessel. The fluid (brackish water, whey or gas mixture) being processed is admitted to one end of the pressure vessel and flows through the separate grid between the adjoining folded membrane leaves of the sandwich in a direction generally parallel to the central mandrel exiting the opposite end. In a typical fluid separation, such as brackish water, a substantially purified product water (permeate) diffuses through the opposing membrane leaves of the sandwich and is absorbed into the porous backing material which transports the product water in a generally radial direction through perforations to the interior of the mandrel through which the purified water product is removed to the exterior of module.

In the field of treatment of water and other liquids it is well known that the channels provided to carry the brine feed become clogged with unfiltered solids or in the case of slurries, a destructive pressure drop must be maintained across and element to force thick viscous material through the element where the membrane extracts liquid. U.S. Pat. No. 3,962,096 pertains to this problem but does not deal with the unavoidable diminishing velocity through the brine channel as permeate or product is extracted. This flow velocity component is necessary for both liquids and gases in order to avoid concentration polarization at the membrane which retards or blocks permeation through the membrane. The prior art considers a tortuous path to be the preferred routing for brine flow to reduce the potential for concentration polarization. There is no data available to confirm this assumption.

Channels of constant cross-section are utilized in prior art construction of product separator. A cross-grid mesh with channels running helixally along the element axis constitutes prior art construction of the brine spacer. These designs pose problems for both the brine channels and the product flow space. The latter carries permeate from the membrane inner surface to the product water tube. As aforementioned, the brine velocity diminishes through the element as permeate is extracted. This reduced velocity increases the concentration polarization and, thereby, reduces the permeation through the membrane at the exit end of the element.

Channels carrying the permeate to the product tube are of the same cross-section along the leaf. No allowance is made for the accumulation of permeate near the product tube, thus, a restriction is imposed reducing the permeate flow.

The product tube is the center of the spirally wound element and the collecting manifold for the permeate. No special allowance is made on current devices for the free flow distribution of the permeate through admitting holes into the product flow channel. The present devices include a plurality of small holes that are partially blocked initially by the first layer of membrane backing material which is generally material known by the trademark TRICOT or SIMPLEX that enwraps the product tube.

In the spiral winding of the elements, the different radius that is assumed by each successive layer requires sliding or relative movement therebetween. This relative movement often damages the membrane layer which must slide relative to the brine space material. The brine space material is generally constructed of highly porous extruded polyurethane or polypropylene. Sharp edges or flashings often damage the membrane surface as the rolling is being done.

Much of the state of the art spirally wound element technology was developed when the flux through membranes was very low and before the introduction of certain improved membrane films which made the process of ultrafilteration and gas separation attractive. Therefore, the state of the art configurations restrict both brine flow and permeate flow for all applications and particularly for the high flux applications of ultrafilteration and gas separation.

Element leaves that are too long have by prior art been shown to have a reduced flux when compared with bench tested membrane samples. This has led to multiple shorter leaf element designs. A limit still exists at the product water tube since the product converges to the product tube at the center of the element. The diameter of larger elements (6" or so) is limited both by pressure consideration on the containing vessel (but not so with low pressure high flow systems) and by the flux reduction at the extreme tips of the leaves.

The present invention provides a spirally wound multi-element module for separating a permeate from a fluid feed mixture which retains the advantages, but eliminates the above referenced defects of the prior art.

SUMMARY OF THE INVENTION

The present invention comprises a spirally wound module for use in separating a permeate from a fluid whether liquid or gas from a feed mixture.

The centrally positioned product tube which carries the permeate and serves as the structural center of the module is highly serrated either in the form of a spiral or rings connected with slots that run along the tube axis. These serrations contain a plurality of openings or apertures that communicate through the product tube to the internal product channel, thereby, providing redundant flow paths for the product. This aids in the reduction of the back pressure on the product side of the flow circuit which causes reduction of the flux through the membrane.

Surrounding the product tube is a channeled polypropylene or polyurethane material product spacer with channel spacers overlapping the serrations of the product tube. The membrane and backing material enwrap the product tube and channel spacer as the element is rolled such that when sealed together at their ends a continuous leaf is first formed. The leaf tapers from the product tube outward to its sealed ends by means of variable lengths of spacer material or single length of tapered spacer material. The latter is preferred when leaf thickness is to be minimized. The highly porous backing which supports the membrane material toward the end of the leaf is the longest with the channeled spacers introduced on either side ribs opposed one at a time to achieve the tapered leaf. A single tapered leaf may also be used or multiple leaves may be constructed in the same manner. The channeled spacers inside the sealed product leaf are oriented so that they are on either side of the highly porous membrane backing material which is preferably the material trademarked TRICOT or SIMPLEX impregnated cloth weaves made by Dupont and others. The separating layers of channeled spacers and TRICOT or SIMPLEX may be varied in order to provide the smallest non-restrictive product flow path.

Brine spacers are positioned on both sides of the leaf between the product tube and the sealed ends of the leaf. Brine channels are formed by separation or spaces between the spacers or ribs that separate the layers of the sprially wound module. Material of the same general type and generally the same configuration as the product spacer is used but with special attention given to the size of the channels formed by the adjacent spacers or ribs as well as the overall thickness. The brine spacers are oriented so that the spacers or ribs run parallel to the axis of the product tube. Two layers of material are used (one on each side of the leaf) with the spacers or ribs pointing in opposite directions. This forms approximately trapezoidal channels that run axially through the module uninterrupted when the elements are wound into the module. The open side of the channel is closed by the membrane surface. The flow velocity through the module is maintained by narrowing the spacer or rib spacing along the fluid flow path. This spacer or rib space reduction reduces the effective down stream area which correspondingly increases the velocity of the brine flow through the channels to compensate for the permeate that has been extracted.

As the elements are being rolled into their final spiral configuration, the layers are caused to slip relative to one another as aforementioned. The layers of brine spacing material slip relative to one another more easily than they slip along the membrane surface. This feature minimizes the damage to the membrane surface since relative motion is taken up primarily by the two layers of brine spacers.

An object of this invention is to provide a fluid separation apparatus which maintains fluid flow velocity through the brine channels.

Another object of this invention is to maintain free flow distribution of the permeate from the membrane into the product flow channel.

Another object of the invention is to provide a tapered product leaf with channel spacers that permit additional leaf length at the circumference where small changes in the diameter produce large amounts of additional membrane surface area.

Still another object of this invention is to eliminate or reduce damage to the membrane during the rolling of the elements into the finished module spiral form.

These and other objects and advantages of the present invention will become apparent when considered in conjunction with the accompanying drawings wherein:

DETAILED DESCRIPTION

Figure 1:
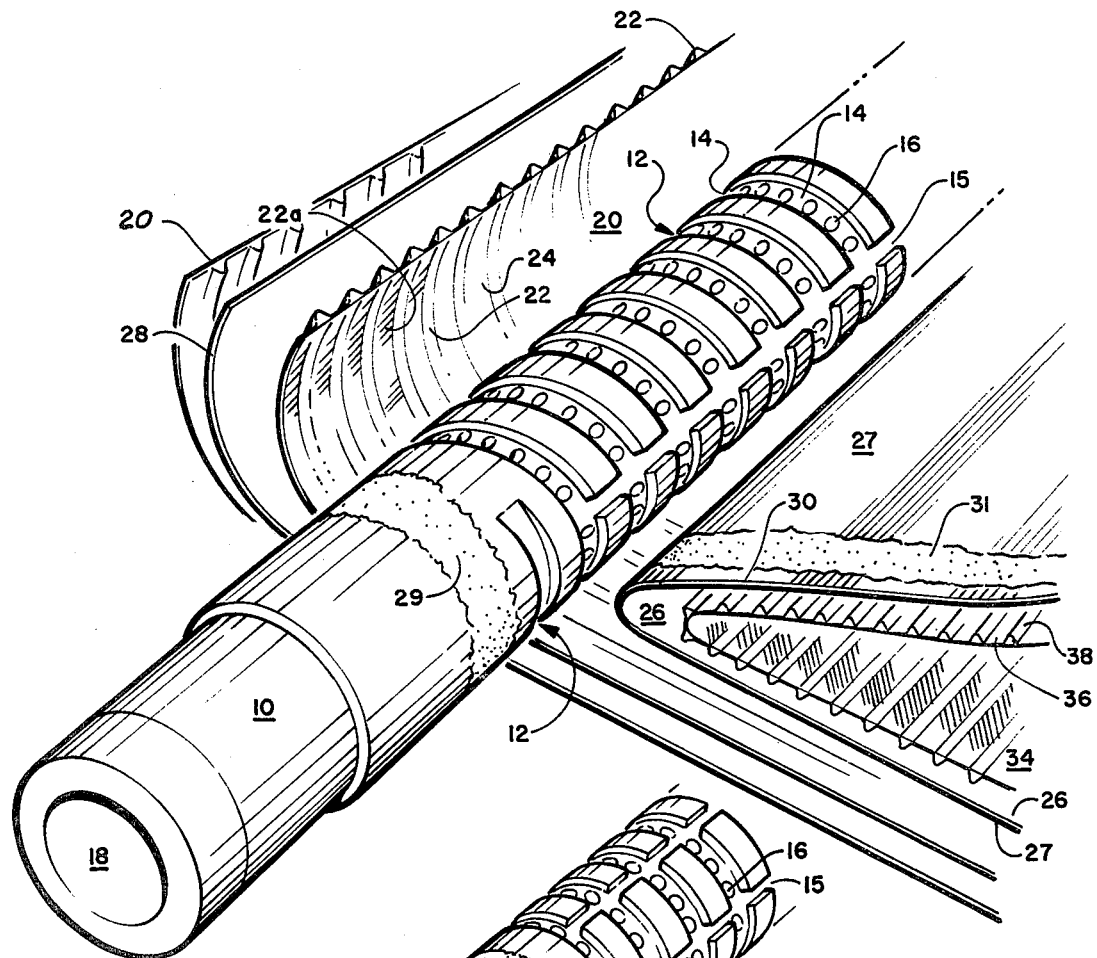
FIG. 1 is a perspective view of a first embodiment of the product tube and the product spacer of the invention.

Referring now specifically to FIG. 1. A product tube 10 is shown. The product tube has a spiral channel 12 with a bottom surface or floor 14 and interconnecting slots 15. The bottom surface or floor 14 contains a plurality of openings or apertures 16 which pass through the floor 14 into the center 18 of the product tube 10. A layer of product spacer material 20, hereinafter discussed in more detail, with protrusions or ribs 22 juxtaposed in a direction perpendicular to the longitudinal axis of the product tube 10. These ribs 22 straddle the spiral channel 12 and slots 15 with a highly porous supporting mesh or cross-ribs 22a preventing intrusion into the spiral channel 12 and slots 15. The overlapping of the channels 12 and the protrusions or ribs 22 forces the permeate to pass through the space 24 of the spacer through the apertures 16, into the center portion 18 and then exit external of the product tube for use. Membrane material 26 with highly porous backing 27 and highly porous spacing material such as TRICOT 28 enwrap the product spacer 20. It should be understood that the initial contacting surface of the membrane material and the product tube are sealed together along both outer edges 29 (one end shown) by any convenient sealing means, such as for example, an adhesive or the like to prevent leakage therebetween.

Figure 2:
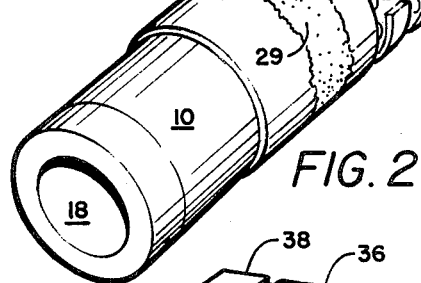
FIG. 2 is a perspective view of a second embodiment of the product tube and the product spacer of the invention.

FIG. 2 depicts the same elements as FIG. 1 except that the channels 12a run substantially perpendicular with the central opening 18 of the tube 10 rather than the spiral form of the channels 12. Interconnecting slots 15 form a grid of channels leading to apertures 16.

As shown in FIG. 1, the lay up of the module prior to the spiral winding (shown in FIG. 5) includes the central product tube 10 first wrapped with the product spacer material 20.

The material of construction of the product spacer is well known in the art and is generally formed from extruded polyurethane, polypropylene or other materials having the same or similar characteristics. The spacer material is cut into different lengths so that after tapering of the cut ends to lie flat, a tapered leaf is achieved.

A membrane 26 is then wrapped over the brine spacer material 34 with the membrane side adjacent to the brine spacer material 20. The membrane includes a porous backing layer 27 which is adhered thereto. The membrane 26 may be constructed of a cellulose acetate semi-permeable film or polysulphone film, however, any other of several classes of semi-permeable membrane may be used to successively practice the invention. The porous separating layer 28 may be TRICOT, SIMPLEX or the like as hereinbefore discussed. As shown, the backing side of the membrane is positioned to come into direct contact with the product spacer material 20. The end surfaces of the membrane are sealed along their outer edge 30 to provide a closed membrane/product spacer system.

Figure 6:
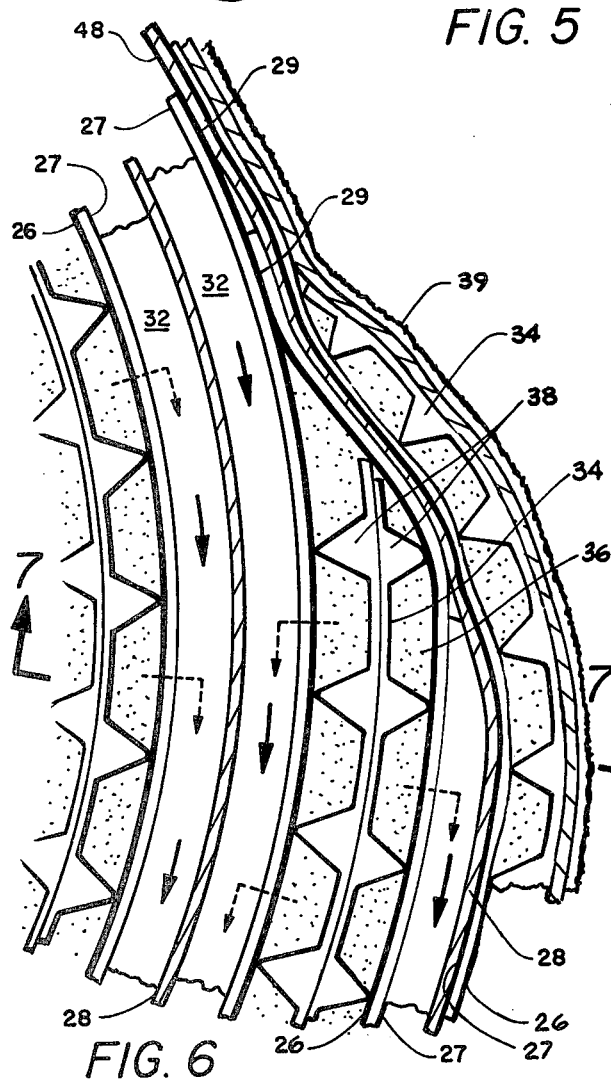
FIG. 6 is a section of FIG. 5 taken along line 6—6.

As shown in FIG. 6, the product fluid travels in the direction of the arrows 32 through the apertures 16 to the center of the product tube 10. Positioned on each side of the membrane 26 are layers of brine space material 34. The brine spacer material is generally constructed of material similar to or the same as the product spacer material 20.

Figure 3:
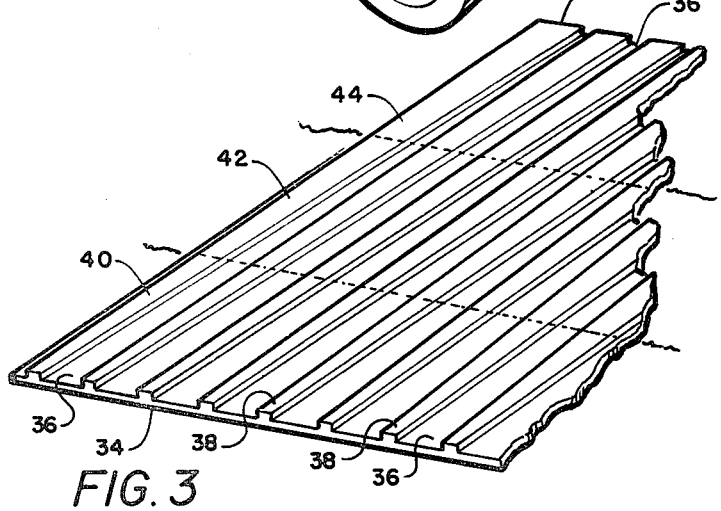
FIG. 3 is a side diagrammatic showing of the placement of the elements comprising the module of the present invention prior to spiral rolling.
Figure 4:
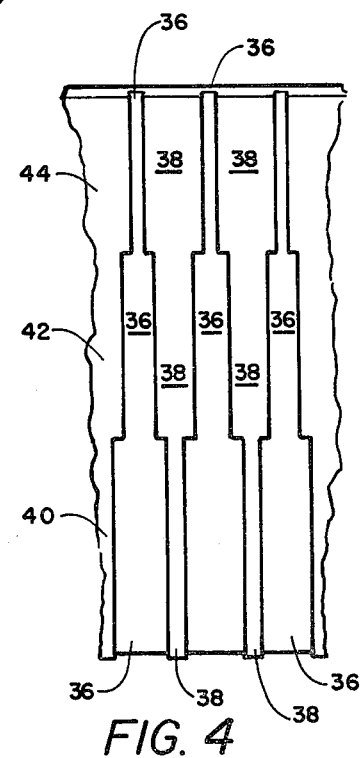
FIG. 4 is a perspective of the channel spacing of the brine spacers of the present invention.

Referring now to FIGS. 3 and 4, the brine spacer material 34 includes a plurality of brine flow channels 36 which are positioned in a juxtaposition relationship in a direction parallel with the longitudinal axis of the product tube 10. The channels 36 are formed between ribs or protrusions 38 which are held together by a mesh formed of cross-links each mesh opening having a cross-section considerably smaller than the width of a rib. The ribs or protrusions 38 rest on the membrane 26 and form a surface of the brine flow channels 36. The width of the brine flow channels 36 diminishes in size from the brine flow input end to the output end of the module. As shown in FIG. 3, there is a tapered three step reduction in the width of the brine flow channels. It should be understood that there may be more or less than three stages of brine channel size reduction or the brine ribs or protrusions may be formed from a single extrusion or other means whereby the brine flow channels are formed by gradually reduced spacing between the ribs or protrusions from the input to output ends of the brine spacer material. In the example of FIG. 4, the brine flow entrance section 40 has wide rib spacing, the intermediate section 42 has intermediate rib spacing and the final section 44 has narrow rib spacing.

Figure 5:
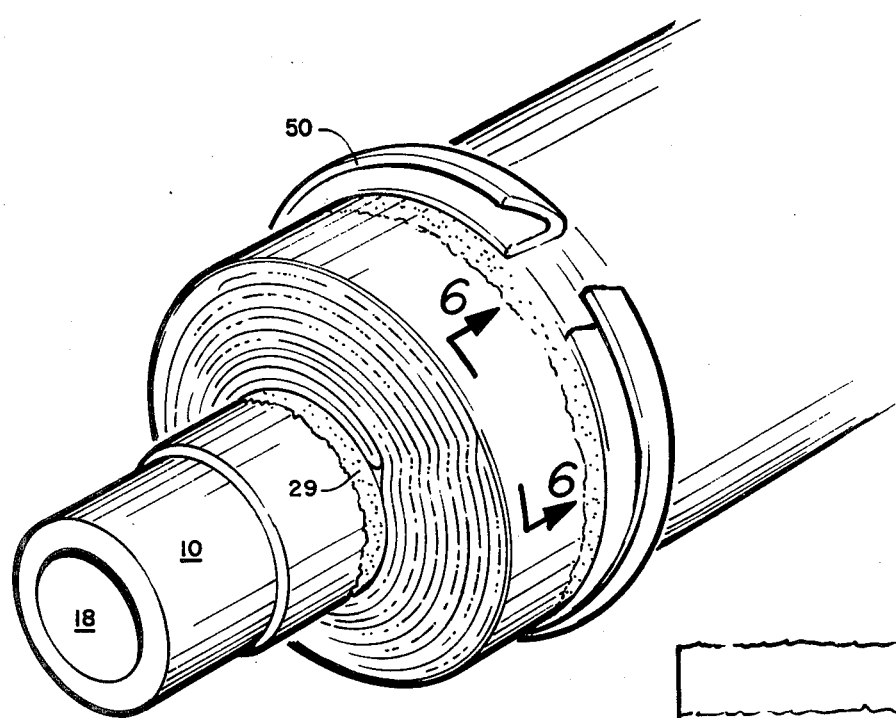
FIG. 5 is a perspective partial showing of the spirally rolled module.

The sandwich structure of FIG. 1 is wound about the product tube 10 to form the wrapped module as shown in FIG. 5.

FIG. 6 is an end section taken from FIG. 5 showing the locations of the constituent elements of the module and brine channels formed thereby. It should be understood that the product leaf may be extended with only spacer material 28, as a product spacer in order to achieve a complete element with a large surface area 48. After the wrap is complete, the external surface of the now cylindrical element is wrapped with a layer of protective material 39, such as, but not limited to, tape or the like.

Figure 7:
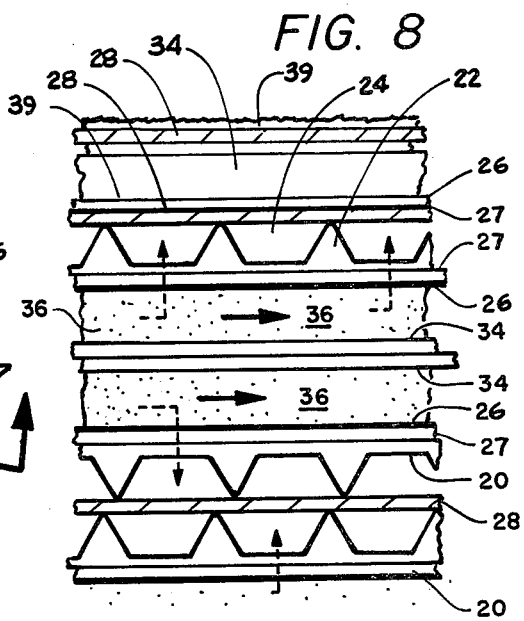
FIG. 7 is a section of FIG. 6 taken along line 7—7.

FIG. 7 is a cross-section of FIG. 6 showing the element layers and the product channel formed thereby.

Figure 8:
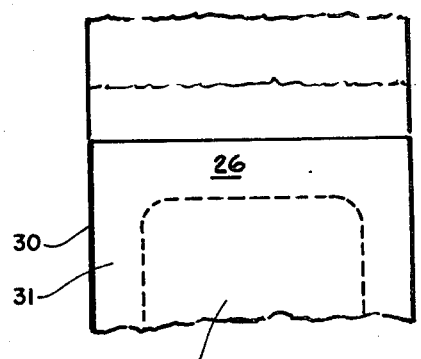
FIG. 8 depicts the sealed end of the product leaf.

FIG. 8 depicts the location of the sealing of the edge 30 and end of the product leaf which includes a continuous adhesive seal along seam 31 (also see FIG. 1), thereby forming a pocket 46.

It should be understood that this completed module would be packaged in a pressure vessel, such as by way of example only, and not by way of limitation, the pressure vessel shown in U.S. Pat. Nos. 3,367,504; 3,417,870 or the like. A brine seal 50 shown in FIG. 5 separates feed from exiting brine by sealing against the pressure vessel inside diameter.

Operation of the module and vessel combination is well known in the art. Brine is forced under pressure through the brine channels in the direction of the arrows shown in FIG. 7. The permeate is forced through the membrane into the product flow channels, flows in the direction of the arrow in FIG. 6, hence through the apertures 16 into the center of the product flow tube where they exit the system. The concentrated brine exits the brine channels at the exit end. The process is continuous.

It will be understood that various modifications and changes will be apparent to those skilled in the art from the foregoing description. Such modifications are deemed to be within the scope of the appended claim.

What is claimed is:

1. A spirally wound module for use in separating a permeate from a fluid feed mixture comprising:
   a product tube serrated along its outer surface, the bottom surface of the serrations having a plurality of spaced apart apertures for communicating between said bottom surface and the interior thereof;
   a highly porous product spacing means having protrusions along one surface thereof;
   a permselective membrane;
   said product spacing means and said membrane are folded over said product tube whereby said protrusions are positioned on the side of said product spacing means opposite said product tube serrations; said product spacing means overlaps said serrations and said membrane sandwiches adjacent layers of said product spacing means therebetween, the edges and free outer ends of the membrane layer and highly porous spacing means are sealed together; and
   first and second highly porous brine spacing means having channels on one surface thereof parallel to the axis of said product tube, the brine spacing means sandwich at least a portion of the folded layers of membrane and product spacing means therebetween, whereby when the membrane, product spacing means and brine spacing means are wound about the product tube at lease some layers of product spacing means and membrane have first and second brine spacing means therebetween and the channels of said first and second brine spacing means are opposing.

2. The invention as defined in claim 1 wherein said serrations are in the form of a helix about said product tube.

3. The invention as defined in claim 1 wherein said serrations are in the form of rings.

4. The invention as defined in claim 1 wherein said serrations are interconnected with longitudinal slots.

5. The invention as defined in claim 2 wherein said serrations are interconnected with longitudinal slots.

6. The invention as defined in claim 3 wherein said serrations are interconnected by longitudinal slots.

7. The invention as defined in claim 1 wherein a layer of backing material is positioned between said product spacing means and said membrane.

8. The invention as defined in claim 1 wherein said layer of backing material is fixedly attached to said membrane.

9. The invention as defined in claim 1 wherein said membrane includes a layer of backing material and a porous separating layer is positioned between said product spacing means and said layer of backing material.

10. The invention as defined in claim 1 wherein said product and brine spacing means are constructed of polypropylene material.

11. The invention as defined in claim 1 wherein said product and brine spacing means are constructed of polyurethane material.

12. The invention as defined in claim 1 wherein said product spacer having ribs on at least one side thereof.

13. The invention as defined in claim 1 wherein said product spacer is tapered outward from said product tube.

14. The invention as defined in claim 1 wherein the channels in said brine spacing means diminish in width along their length.

15. The invention as defined in claim 1 wherein the channels in said brine spacing means are approximately trapezoidal.

16. The invention as defined in claim 1 wherein the aperture size is in the range of from 0.010 inches to 0.10 inches.

17. The invention as defined in claim 16 wherein the size of the apertures is approximately 0.03 inches.

18. The invention as defined in claim 1 wherein the channels between said protrusions in said product spacing means are approximately trapezoidal.

* * * * *